United States Patent
Kumagai et al.

(10) Patent No.: US 8,836,930 B2
(45) Date of Patent: Sep. 16, 2014

(54) ROTATION ANGLE DETECTING APPARATUS AND SURVEYING INSTRUMENT

(71) Applicant: Kabushiki Kaisha TOPCON, Tokyo-to (JP)

(72) Inventors: Kaoru Kumagai, Tokyo-to (JP); Tetsuji Anai, Tokyo-to (JP); Kazuki Osaragi, Tokyo-to (JP); Fumio Ohtomo, Asaki (JP)

(73) Assignee: Kabushiki Kaisha TOPCON, Tokyo-to (JP)

(*) Notice: Subject to any disclaimer, the term of this patent is extended or adjusted under 35 U.S.C. 154(b) by 0 days.

(21) Appl. No.: 13/718,329

(22) Filed: Dec. 18, 2012

(65) Prior Publication Data
US 2013/0155397 A1 Jun. 20, 2013

(30) Foreign Application Priority Data
Dec. 19, 2011 (JP) ................. 2011-277661

(51) Int. Cl.
*G01B 11/26* (2006.01)
*G01D 5/245* (2006.01)
*G01D 5/347* (2006.01)
*G01C 15/00* (2006.01)

(52) U.S. Cl.
CPC .............. *G01B 11/26* (2013.01); *G01D 5/2457* (2013.01); *G01D 5/3473* (2013.01); *G01C 15/002* (2013.01)
USPC ........................................ 356/138

(58) Field of Classification Search
CPC ...... G01B 11/26; G01B 11/27; G01C 15/002; G01D 5/2457; G01D 5/3473
USPC ................. 356/138–153, 213–233, 247–255
See application file for complete search history.

(56) References Cited

U.S. PATENT DOCUMENTS 4,272,165 A * 6/1981 Muchel et al. ................. 351/211
6,657,211 B2 * 12/2003 Benner ..................... 250/492.22

(Continued)

FOREIGN PATENT DOCUMENTS

DE 19750474 A1 6/1999
JP 2003-5004 A 1/2003

(Continued)

OTHER PUBLICATIONS

Extended European Search Report completed Nov. 12, 2013 in corresponding European patent application No. EP 12197876.1.

(Continued)

*Primary Examiner* — Michael A Lyons
*Assistant Examiner* — Shawn Decenzo
(74) *Attorney, Agent, or Firm* — Nields, Lemack & Frame, LLC

(57) ABSTRACT

A rotation angle detecting apparatus comprises a bearing holder, a rotation shaft rotatably supported by said bearing holder, a shaft portion space formed in said rotation shaft, a bearing holder space formed in said bearing holder, a first condenser lens in said shaft portion space and having an optical axis that coincides with a center line of said rotation shaft, a second condenser lens in said bearing holder space and on an extension of a center line of said rotation shaft, an angle detection pattern at a focal position of one of said first and said second condenser lens, and an image sensor at a focal position of the other of said condenser lens, wherein said image sensor detects a projection image of said angle detection pattern projected onto said image sensor, and a displacement of said projection image involved by the rotation of said rotation shaft is detected.

11 Claims, 6 Drawing Sheets

(56) References Cited

U.S. PATENT DOCUMENTS

| | | | |
|---|---|---|---|
| 6,892,464 B2* | 5/2005 | Ohtomo et al. | 33/290 |
| 6,936,817 B2* | 8/2005 | Feuerbaum | 250/310 |
| 6,992,757 B2* | 1/2006 | Holcomb et al. | 356/218 |
| 7,041,961 B2* | 5/2006 | Siraky | 250/231.13 |
| 7,199,355 B2* | 4/2007 | Lippuner | 250/231.13 |
| 7,214,917 B2* | 5/2007 | Ohtomo et al. | 250/206.1 |
| 7,697,127 B2* | 4/2010 | Vogel et al. | 356/154 |
| 8,031,334 B2* | 10/2011 | Lippuner et al. | 356/138 |
| 8,056,250 B2* | 11/2011 | Yanata | 33/550 |
| 8,124,928 B2* | 2/2012 | Villaret | 250/231.13 |
| 8,321,167 B2* | 11/2012 | Haijima et al. | 702/94 |
| 8,345,259 B2* | 1/2013 | Parriaux et al. | 356/499 |
| 2011/0044561 A1 | 2/2011 | Braunecker et al. | |
| 2013/0155224 A1* | 6/2013 | Ohtomo et al. | 348/136 |

FOREIGN PATENT DOCUMENTS

| | | |
|---|---|---|
| JP | 2008-241529 A | 10/2008 |
| JP | 2009-156773 A | 7/2009 |
| WO | 2009/103342 A1 | 8/2009 |

OTHER PUBLICATIONS

Extended European Search Report completed Nov. 8, 2013 in co-pending European patent application No. EP 12197889.4.

\* cited by examiner

ROTATION ANGLE DETECTING APPARATUS AND SURVEYING INSTRUMENT

BACKGROUND OF THE INVENTION

The present invention relates to a rotation angle detecting apparatus for detecting a rotation angle and a surveying instrument for measuring an angle and a distance of an object to be measured.

A total station has become widespread as a surveying instrument for measuring an angle and a distance of an object to be measured in the civil engineering or construction field. The total station can highly accurately measure an angle and a distance of the object to be measured at from a short-distance to a long-distance, but an inexpensive and small total station with good mobility that is used at a site targeting a relatively short distance, e.g., the interior field etc. (which will be referred to as a mini total station hereinafter) has been recently demanded more.

As one of causes of an increase in price of the total station, there is a demand for high accuracy of an angle detection accuracy and a rotation accuracy.

An error of a measurement value due to an angular error is proportionate to a distance to a object to be measured, and hence an angular accuracy is demanded to a degree of a second. Therefore, a detection error of a rotation angle detecting apparatus and a rotation error (a tilt error involved by rotation on the rotational center) due to wobbling of a rotation shaft of a telescope for measurement which can be a cause of an angular error are strictly limited.

As a rotation angle detecting apparatus for use in a surveying instrument, an encoder has been conventionally adopted, and a highly accurate encoder is expensive. Further, it is difficult to set a rotation accuracy of a rotation shaft to a demanded accuracy, just by managing a processing accuracy of a lone component, and fine adjustment and fine finishing in an assembling state of the rotation shaft and a bearing holder are required, which results in expensiveness.

SUMMARY OF THE INVENTION

It is an object of the present invention to provide a rotation angle detecting apparatus that enables highly accurate angular detection with a simple structure and a surveying instrument using the rotation angle detecting apparatus.

To attain the above object, a rotation angle detecting apparatus according to the present invention comprises a bearing holder, a rotation shaft rotatably supported by the bearing holder, a shaft portion space formed in the rotation shaft, a bearing holder space formed in the bearing holder, a first condenser lens which is accommodated in the shaft portion space and has an optical axis that coincides with a centerline of the rotation shaft, a second condenser lens which is provided in the bearing holder space and also provided on an extension of a center line of the rotation shaft, an angle detection pattern provided at a focal position of one of the first condenser lens and the second condenser lens, and an image sensor provided at a focal position of the other of the first condenser lens and the second condenser lens, and in the rotation angle detecting apparatus, the image sensor detects a projection image of the angle detection pattern projected onto the image sensor, and a displacement of the projection image involved by the rotation of the rotation shaft is detected.

Further, in the rotation angle detecting apparatus according to the present invention, a reference position can be set on the image sensor, and a rotational displacement amount of the angle detection pattern with respect to the reference position is detected.

Further, in the rotation angle detecting apparatus according to the present invention, the angle detection pattern is detected by the image sensor, a center position of an angle detection pattern image is detected based on the angle detection pattern, and a tilt angle of the rotation shaft is detected based on a deviation between the detected center position of the angle detection pattern image and the reference image on the image sensor and based on a focal length of the first condenser lens or the second condenser lens.

Further, in the rotation angle detecting apparatus according to the present invention, the angle detection pattern has a line-segment pattern in which line segments extending in a radial direction are arranged on a total circumference at a predetermined angle pitch and a ring-like track formed of the line segments is provided.

Further, in the rotation angle detecting apparatus according to the present invention, the angle detection pattern has a circular pattern of one circle or a plurality of concentric circles with the center of the angle detection pattern as a center.

Further, in the rotation angle detecting apparatus according to the present invention, the angle detection pattern has a plurality of concentrically multiply-formed ring-like tracks.

Further, in the rotation angle detecting apparatus according to the present invention, the angle detection pattern is detected when a detection line is set on the image sensor and a detection signal of the angle detection pattern is extracted from a signal obtained by scanning the detection line.

Further, in the rotation angle detecting apparatus according to the present invention, the detection line is a straight line which runs through the center of the angle detection pattern on the image sensor and is set to fall within the range including each track in accordance with each track in a direction orthogonal to each radius that equally divides the circumference as required.

Further, in the rotation angle detecting apparatus according to the present invention, the angle detection pattern is detected when a detection line is set on the image sensor and a detection signal of the angle detection pattern is extracted from a signal obtained by scanning the detection line, and the detection line is a straight line which runs through the center of the angle detection pattern on the image sensor and cuts across the circular pattern.

Further, in the rotation angle detecting apparatus according to the present invention, the detection line is a circle which is included in the track and has the center of the angle detection pattern on the image sensor as its center.

Further, a surveying instrument according to the present invention comprises a base unit, a frame rotatably provided on the base unit through a first rotation shaft having a vertical shaft center line, a telescope unit rotatably provided on the frame through a second rotation shaft having a horizontal shaft center line, a first rotation angle detecting apparatus which is provided between the first rotation shaft and the base unit and has the configuration according to claim 1, and a second rotation angle detecting apparatus which is provided between the second rotation shaft and the mount and has the configuration according to claim 1.

According to the present invention, the rotation angle detecting apparatus comprises a bearing holder, a rotation shaft rotatably supported by the bearing holder, a shaft portion space formed in the rotation shaft, a bearing holder space formed in the bearing holder, a first condenser lens which is accommodated in the shaft portion space and has an optical axis that coincides with a center line of the rotation shaft, a second condenser lens which is provided in the bearing holder space and also provided on an extension of a center line of the rotation shaft, an angle detection pattern provided at a focal position of one of the first condenser lens and the second condenser lens, and an image sensor provided at a focal position of the other of the first condenser lens and the second condenser lens, and in the rotation angle detecting apparatus, the image sensor detects a projection image of the angle detection pattern projected onto the image sensor, and a displacement of the projection image involved by the rotation of the rotation shaft is detected. As a result, a rotation angle of the rotation shaft can be measured without using an expensive encoder.

Further, according to the present invention, in the rotation angle detecting apparatus, a reference position can be set on the image sensor, and a rotational displacement amount of the angle detection pattern with respect to the reference position is detected. As a result, the reference position can be set an arbitrary position at an arbitrary timing, the rotation shaft and the bearing holder do not have to be mechanically set, and initial setting of the angle measurement can be facilitated.

Further, according to the present invention, in the rotation angle detecting apparatus, the angle detection pattern is detected by the image sensor, a center position of an angle detection pattern image is detected based on the angle detection pattern, and a tilt angle of the rotation shaft is detected based on a deviation between the detected center position of the angle detection pattern image and the reference image on the image sensor and based on a focal length of the first condenser lens or the second condenser lens. As a result, even if the rotation of the rotation shaft contains an error, a measurement value can be corrected by using the detected tilt angle. Even if an assembling accuracy of the rotation shaft is not high, the highly accurate measurement is possible, and a manufacturing cost can be reduced.

Further, according to the present invention, in the rotation angle detecting apparatus, the angle detection pattern is detected when a detection line is set on the image sensor and a detection signal of the angle detection pattern is extracted from a signal obtained by scanning the detection line. As a result, the detection line can be arbitrarily set, the detection lines may overlap each other, the positions or the numbers of the detection lines in the setting are not limited, and the setting can be configured in accordance with the measurement accuracy.

Furthermore, according to the present invention, the surveying instrument comprises a base unit, a frame rotatably provided on the base unit through a first rotation shaft having a vertical shaft center line, a telescope unit rotatably provided on the frame through a second rotation shaft having a horizontal shaft center line, a first rotation angle detecting apparatus which is provided between the first rotation shaft and the base unit and has the configuration according to claim 1, and a second rotation angle detecting apparatus which is provided between the second rotation shaft and the mount and has the configuration according to claim 1. As a result, an expensive encoder is not used, an error produced in the assembling of the rotation shaft and the bearing holder can be corrected by using a detection result of the rotation angle detecting apparatus, the assembling of the rotation shaft and the bearing holder is not costly, and the manufacturing cost can be reduced.

BRIEF DESCRIPTION OF THE DRAWINGS

FIG. 7A shows a relationship between the pattern and the pattern detection and FIG. 7B is an explanatory drawing linearly developing the pattern.

DETAILED DESCRIPTION OF THE PREFERRED EMBODIMENTS

Figure 1A:
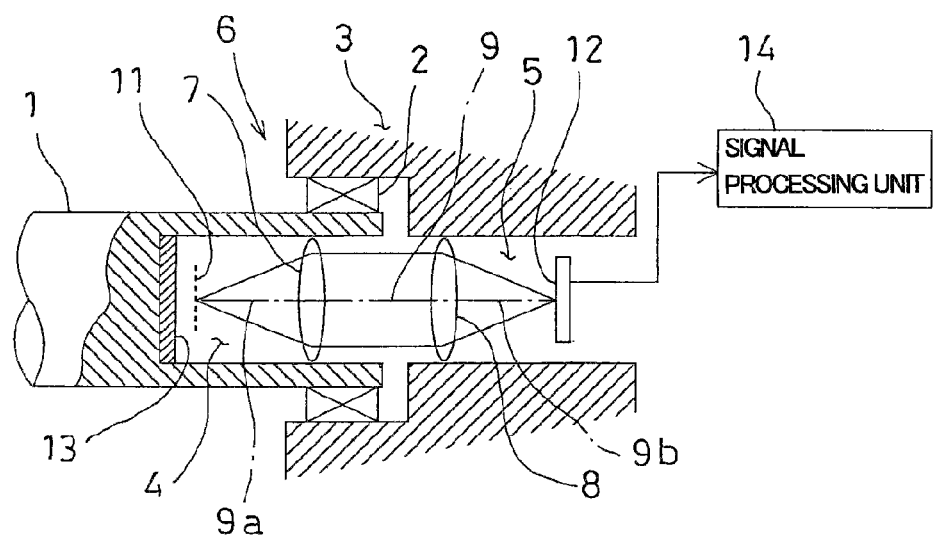
FIG. 1A is a schematic cross-sectional view of a rotation angle detecting apparatus according to an embodiment of the present invention.

Description will be given below on the embodiments of the present invention by referring to the drawings.

Figure 1B:
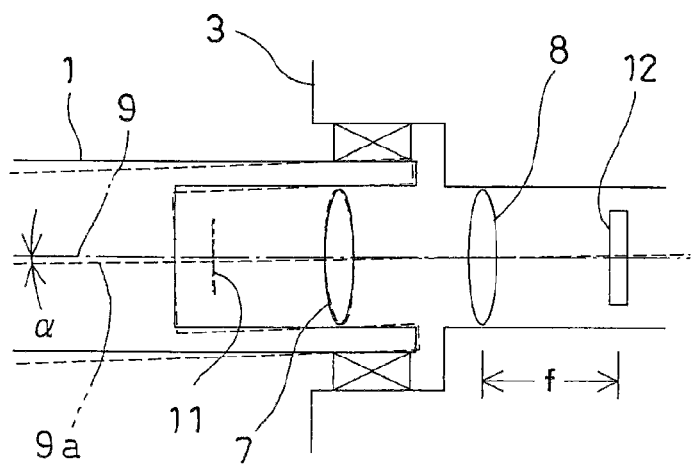
FIG. 1B is an explanatory drawing in a case where a rotation shaft of an object to be measured tilts.

First, in FIG. 1A and FIG. 1B, description will be given on a rotation angle detecting apparatus according to an embodiment of the present invention.

In FIG. 1, the reference numeral 1 denotes a rotation shaft which is an object to be measured with respect to a rotation angle measurement, and the rotation shaft 1 is freely rotatably supported by a bearing holder 3 via a bearing 2.

A cylindrical shaft portion space 4 is formed at an end portion of the rotation shaft 1 so as to be concentric with a center line of the rotation shaft 1, and a shaft end portion has a hollow structure. In the bearing holder 3, a bearing holder space 5 is formed on an extended line of the shaft center line of the shaft portion space 4. The bearing holder space 5 is concentric with the shaft portion space 4, and the bearing holder space 5 and the shaft portion space 4 have the same diameter. Primary constituent elements of a rotation angle detecting apparatus 6 are accommodated in the shaft portion space 4 and the bearing holder space 5.

A first condenser lens 7 is provided in the shaft portion space 4, and a second condenser lens 8 is provided in the bearing holder space 5. Each of the first condenser lens 7 and the second condenser lens 8 has a magnifying power of 1, and these lenses have the same focal length.

The first condenser lens 7 and the second condenser lens 8 have optical axes 9a and 9b, respectively, the optical axis 9a coincides with the center line of the rotation shaft 1, and the optical axis 9b coincides with the shaft center line of the bearing holder space 5. Therefore, when the rotation shaft 1 does not have a tilt, the optical axis 9a and the optical axis 9b coincide with each other on the same straight line.

In addition, it is preferable for the first condenser lens 7 and the second condenser lens 8 to have the same characteristics in order to prevent an image from being distorted.

An angle detection pattern 11 is provided on a bottom portion of the shaft portion space 4, and the angle detection pattern 11 is placed at a focal position of the first condenser lens 7. Further, an image sensor 12 is provided in the bearing holder space 5, and the image sensor 12 is placed at a focal position of the second condenser lens 8.

A light emitting unit for illuminating the angle detection pattern 11 is provided at an appropriate position of the bearing holder space 5 or the shaft portion space 4. In the drawing, as an example, a light emitting unit 13 that is provided on the bottom portion of the shaft portion space 4 and illuminates the angle detection pattern 11 is shown.

As the image sensor 12, for example, a CCD or a CMOS sensor as an aggregate of pixels etc. is used, and a position of each pixel can be specified on the image sensor 12. Furthermore, a photodetection signal from the image sensor 12 is input to a signal processing unit 14, and the signal processing unit 14 is configured to measure a rotation angle or a tilt (a tilt angle) of the rotation shaft 1 based on the photodetection signal.

Figure 2:
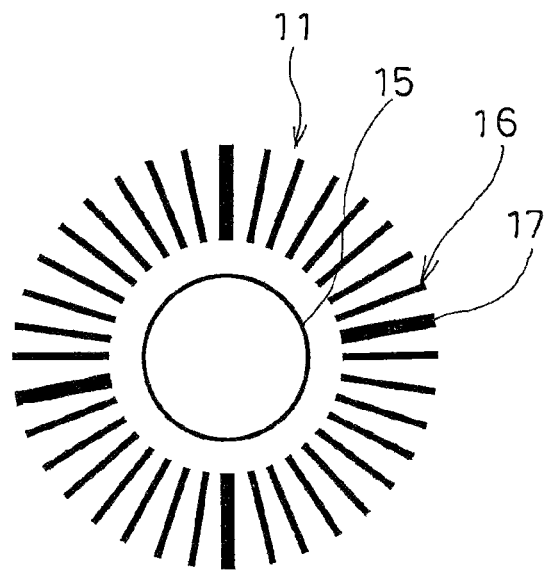
FIG. 2 is an explanatory drawing to show a first example of an angle detection pattern for use in the rotation angle detecting apparatus.

FIG. 2 shows an example of the angle detection pattern 11.

A basic shape of the angle detection pattern 11 is a circle, and the center of the angle detection pattern 11 coincides with the optical axis of the first condenser lens 7, i.e., the optical axis 9a.

The angle detection pattern 11 is configured by a circular pattern 15 for centering provided at the central portion thereof and a line-segment pattern 16 arranged around the circular pattern 15. The circular pattern 15 is a true circle described with a predetermined line width.

The line-segment pattern 16 has a configuration that line segments extending in the radial direction are arranged on a total circumference at a predetermined angle pitch, and a ring-like track is formed by using the line-segment pattern 16. In the line-segment pattern 16, identification line segments 17 provided at a plurality of predetermined positions are thick. An inner end and an outer end of the line-segment pattern 16 are placed on the circumferences which are concentric with the circular pattern 15, respectively. Moreover, as shown in the drawing, the identification line segments 17 are not provided at the positions that equally divide the circumference, and detecting the positions of the identification line segment 17 enables detecting a rotation angle exceeding a pitch interval of the angle detection pattern 11.

Description will be given below on an operation of the above-mentioned rotation angle detecting apparatus 6.

The angle detection pattern 11 is projected onto the image sensor 12 with a relationship of 1:1 by the operations of the first condenser lens 7 and the second condenser lens 8, and the image sensor 12 emits a signal corresponding to the received angle detection pattern 11.

When the rotation shaft 1 rotates, the angle detection pattern 11 rotates integrally with the rotation shaft 1, and a rotated angle detection pattern image is projected onto the image sensor 12. Since the image sensor 12 emits the photodetection signal in accordance with each pixel, for example, when the line-segment pattern 16 and the identification line segment 17 move, the positions of the pixels receiving the lights of the line-segment pattern 16 and the identification line segment 17 change. Therefore, when the positional change of the pixels receiving the lights of the line-segment pattern 16 and the identification line segment 17 is detected based on the signals from the image sensor 12, a rotation angle of the rotation shaft 1 with respect to the bearing holder 3 can be detected.

Next, description will be given on a situation where the rotation shaft 1 tilts with respect to the bearing holder 3.

With the operations of the first condenser lens 7 and the second condenser lens 8, a light ray that enters the first condenser lens 7 is projected onto the image sensor 12 so as to be parallel to the light ray by the second condenser lens 8. Therefore, as shown in FIG. 1B, when the optical axis 9a of the first condenser lens 7 tilts with respect to the optical axis 9 of the second condenser lens 8, the angle detection pattern image projected onto the image sensor 12 is projected onto the image sensor 12 for an amount corresponding to the tilt of the optical axis 9a of the first condenser lens 7 from a tilting direction. Therefore, the projected image is displaced on the image sensor 12 for an amount corresponding to the tilt.

Here, assuming that a displacement amount of the pattern image on the image sensor 12 is Δ, the tilt of the optical axis 9a of the first condenser lens 7 is α, and a focal point of the second condenser lens 8 is f, $\tan \alpha = \Delta/f$ is achieved. Additionally, the center of the circular pattern 15 represents the center of the angle detection pattern 11, detecting a position of each pixel of the image sensor 12 that receives the light of the circular pattern 15 enables determining the center of the circular pattern 15, and determining a deviation between the center of the circular pattern 15 and the center of the yet-to-be-tilted circular pattern 15 enables determining the displacement amount Δ. Therefore, the tilt of the optical axis 9a of the first condenser lens 7, i.e., a tilt angle of the rotation shaft 1 can be detected based on a photodetection result of the image sensor 12.

Since the rotation of the angle detection pattern 11 on the image sensor 12 or the displacement amount Δ of the center position of the angle detection pattern 11 can be detected in pixels of the image sensor 12, the highly accurate measurement is possible.

Further, in the present embodiment, the rotation angle and the tilt of the rotation shaft 1 can be detected. When a measurement value is corrected based on the detected tilt, a measurement result excluding an influence of the tilt of the rotation shaft 1 can be obtained. Therefore, even if the rotation of the rotation shaft 1 includes an error, namely, even if the assembling of the rotation shaft 1 is not highly accurately carried out, an angle can be highly accurately detected.

It is to be noted that, in the foregoing embodiment, the image sensor 12 may be provided on the rotation shaft 1 side and the angle detection pattern 11 may be provided on the bearing holder 3 side.

Figure 3:
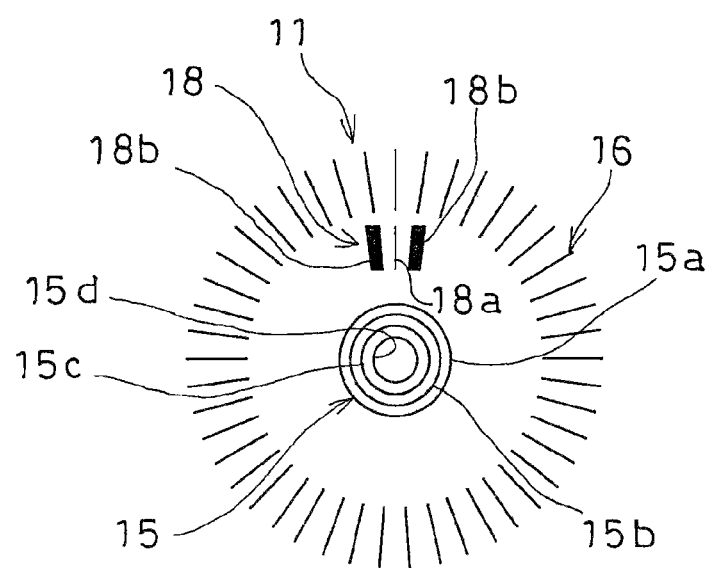
FIG. 3 is an explanatory drawing to show a second example of the angle detection pattern for use in the rotation angle detecting apparatus.

FIG. 3 shows a second example of the angle detection pattern 11.

In the second example, the circular pattern 15 is configured by a plurality of (four in the drawing) concentric circles 15a to 15d. When the circular pattern 15 is configured by the plurality of circles 15a to 15d, and the centers of the respective circles 15a to 15d can be obtained, and averaging the obtained center positions enables highly accurately determining the center position of the angle detection pattern 11.

Furthermore, in the second example, besides the circular pattern 15 and the line-segment pattern 16, a reference designation pattern 18 is provided. The reference designation pattern 18 is configured by three line segments 18a and 18b extending in the radial direction on a circumference having a diameter (a small diameter in the drawing) different from a diameter of the circumference where the line-segment pattern 16 is provided, the line segments 18a and 18b are arranged at an equal angle pitch, and the line segments 18b at both sides are formed with a large line width. It is to be noted that the line segments 18a and 18b may have the same line width.

Since the reference designation pattern 18 is provided, when a position of the reference designation pattern 18 is detected by the image sensor 12 at the start of measurement and the detected position is set as a reference position, an angle at a time of the measurement can be determined from a difference between the position of the reference designation pattern 18 at the time of measurement and the reference position. Furthermore, an infinitesimal rotation angle is detected based on a deviation between the line segments in the line-segment pattern 16.

Figure 4:
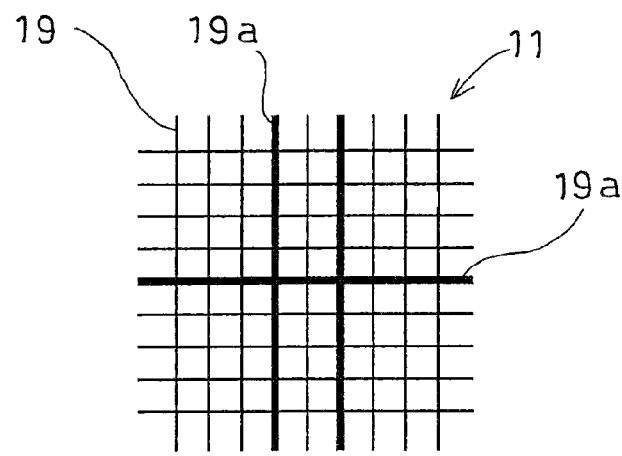
FIG. 4 is an explanatory drawing to show a third example of the angle detection pattern for use in the rotation angle detecting apparatus.

FIG. 4 shows a third example of the angle detection pattern 11.

The third example represents the case where the angle detection pattern 11 is a lattice pattern which is configured by a plurality of straight lines 19 as arranged to be orthogonal to each other at equal intervals. In the straight lines 19, some of straight lines 19a have a large line widths, and the straight lines 19a enable detecting the center of the angle detection pattern 11 and a reference position and also enable detecting a posture of the angle detection pattern 11 in a rotating direction.

Figure 5:
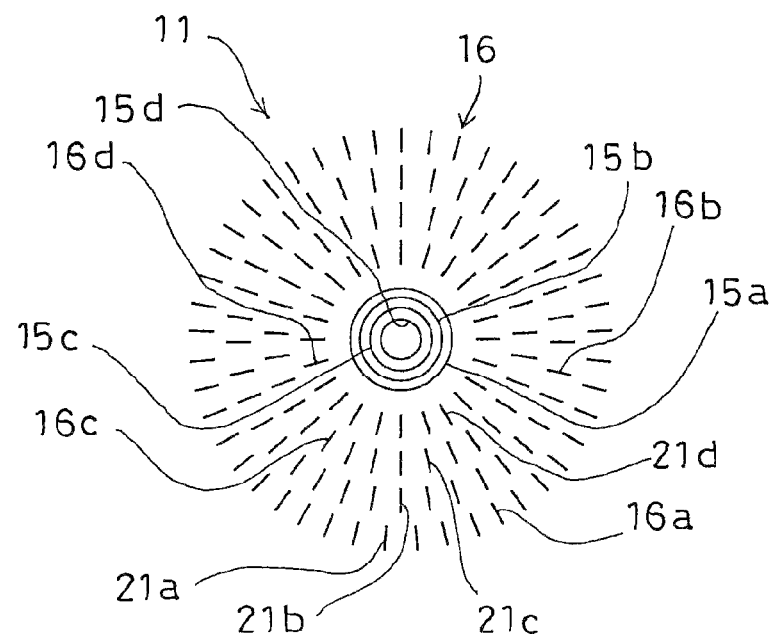
FIG. 5 is an explanatory drawing to show a fourth example of the angle detection pattern for use in the rotation angle detecting apparatus.

FIG. 5 shows a fourth example of the angle detection pattern 11.

In the fourth example, the circular pattern 15 is configured by a plurality of (four in the drawing) concentric circles 15a to 15d, and the line-segment pattern 16 is configured by the fact that a plurality of (four in the drawing) tracks 16a, 16b, 16c, and 16d are concentrically multiply-arranged.

Like the line-segment pattern 16 shown in FIG. 2, each of the tracks 16a, 16b, 16c, and 16d has a configuration that line segments 21 extending in the radial direction are arranged on the total circumference at a predetermined angle pitch.

Further, the angle pitches of the respective line segments 21a, 21b, 21c, and 21d configuring the tracks 16a, 16b, 16c, and 16d slightly differ for each of the tracks 16a, 16b, 16c, and 16d, and detecting a phase relationship of the respective line segments 21a, 21b, 21c, and 21d among the tracks enables determining a rotational position. In the fourth example, since a rotational position of the angle detection pattern 11 is uniquely determined based on the phase relationship between the respective line segments 21a, 21b, 21c, and 21d. Therefore, like the first example (see FIG. 2), some of line segments 21 do not have to be thickened. Furthermore, since an inner end and an outer end of each of the line segments 21 on each track are placed on the respective circumferences, by detecting the inner end and the outer end of the line segments 21, the circles can be detected, and hence a center position can be detected based on the detected circles. Therefore, the circular pattern 15 can be omitted.

It is to be noted that the various kinds of angle detection patterns 11 can be considered, and this pattern is not restricted to the above-described example.

Next, description will be given on a method for detecting an angle and a center by using the above-mentioned pattern.

First, by referring to FIG. 6, description will be given on a first example of the method for detecting an angle and a center. Additionally, the first example will be described by using the fourth angle detection pattern 11 shown in FIG. 5.

Based on the signals emitted from all the pixels constituting the image sensor 12, the respective line segments 21a, 21b, 21c, and 21d of the respective tracks 16a, 16b, 16c, and 16d can be recognized, and a rotation angle and a center of the angle detection pattern 11 can be determined. However, description will be given below on a method for more easily detecting an angle and a center.

Figure 6:
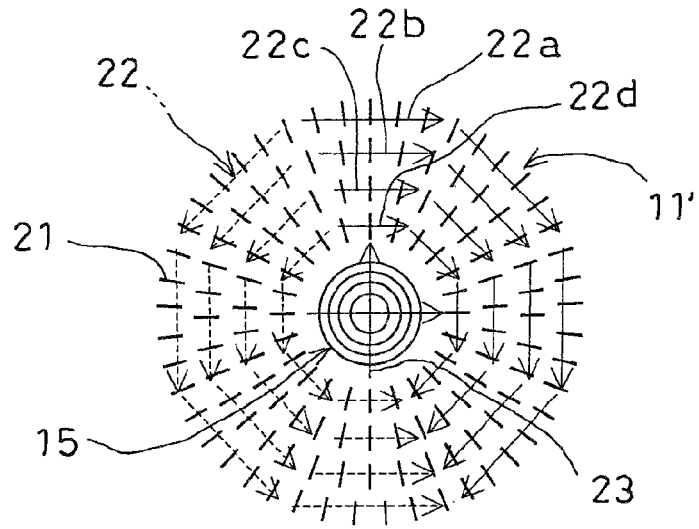
FIG. 6 shows a first example of an angle detecting method using the angle detection pattern and FIG. 6 is an explanatory drawing to show a relationship between the pattern and the pattern detection.

FIG. 6 shows an angle detection pattern image 11' projected on the image sensor 12. Further, the center of the angle detection pattern image 11' shown in the drawing coincides with the center of the image sensor 12.

To acquire a photodetection signal from the image sensor 12, a scan line is set at a predetermined position, the scan line is scanned, and the outputs from the pixels on the scan line are acquired. In regard to the setting of the scan line, each angle detection line 22 for angle detection and each center detection line 23 for center detection are set.

First, each angle detection line 22 is set to be orthogonal to a radius that equally divides the circumference (equally divides the circumference into eight pieces) and to be included in each of the tracks 16a, 16b, 16c, and 16d. Therefore, according to the first method, the circumference is divided into eight pieces, and the number of the tracks is four, and there are the 32 angle detection lines 22.

Then, each of two center detection line 23 that runs through the center of the image sensor 12 is set so as to cut across the circular pattern 15. It is preferable for the two center detection lines 23 to be orthogonal to each other.

In a case of detecting an angle, when each angle detection line 22 is scanned, the signals of the pixels at the positions where the angle detection line cuts across the line segments 21 can be obtained. For example, giving a description on the angle detection lines 22a to 22d, when the angle detection line 22a is canned, every time the angle detection line cuts across the line segment 21, a detection signal for the line segment 21 is obtained, and a position of a pixel that outputs the detection signal can be identified on the image sensor 12.

Subsequently, when the angle detection line 22b is scanned, likewise, every time the angle detection line cuts across the line segment 21, a detection signal for the line segment 21 is obtained, and a position of the pixel that outputs the detection signal can be identified on the image sensor 12. Furthermore, in regard to the angle detection line 22c and the angle detection line 22d, the detection signals of the line segments 21 can be sequentially obtained, and the positions of the detection signals can be identified on the image sensor 12.

When the detection signals obtained by scanning the angle detection lines 22a to 22d are compared among the angle detection lines 22a to 22d, phase differences among the respective angle detection lines 22a to 22d can be detected, and further, a rotation angle of the angle detection pattern 11 with respect to a reference position of the image sensor 12 can be detected based on the phase differences.

The rotation angle can be detected by one pair of angle detection lines 22 that cut across one radius, but detecting an angle by using another pair or a plurality of pairs of angle detection line 22 and averaging the detection results can further improve a measurement accuracy. Further, when a result obtained by the one pair of angle detection lines 22 and a result obtained by another pair of angle detection lines 22 having a 180° different phase with respect to the one pair of angle detection lines 22 are averaged, an error produced due to, e.g., the pattern collapse etc. can be canceled out.

The angle detection lines 22 to be set are not physically set on the image sensor 12, but they are virtual lines used at a time of extracting the signals, and hence the angle detection lines 22 adjacent to each other may overlap each other. Therefore, the angle detection lines 22 that cut across the infinitely divided radiuses can be set in theory. Moreover, the larger the number of the divided radiuses is, i.e., the larger the number of the pairs of angle detection lines 22 is, the higher the measurement accuracy is improved.

Additionally, the number of division and the number of the pairs of angle detection lines 22 can be appropriately set in accordance with the demanded measurement accuracy. That is, for example, when a high accuracy is demanded, the number of division and the number of the pairs of angle detection lines 22 are increased. When a high accuracy is not demanded, the number of division and the number of the pairs are reduced.

Subsequently, in case of determining a center of the angle detection pattern image 11', each center detection line 23 is scanned. When the center detection line 23 is scanned, every time the center detection line cuts across the circles 15a to 15d, the detection signals for the line segments 21 are obtained, and a center position of the angle detection pattern image 11' can be determined based on the obtained signals.

The determined center position of the angle detection pattern image 11' is compared with the reference position of the image sensor 12. When the optical axis 9a (the rotation shaft 1) tilts, a deviation is determined, and a tilt angle of the optical axis 9a is determined based on the deviation. When the number of circular patterns 15 is increased and the number of center detection lines 23 is increased, many detection values can be obtained, and a detection accuracy can be improved.

Figure 7A:
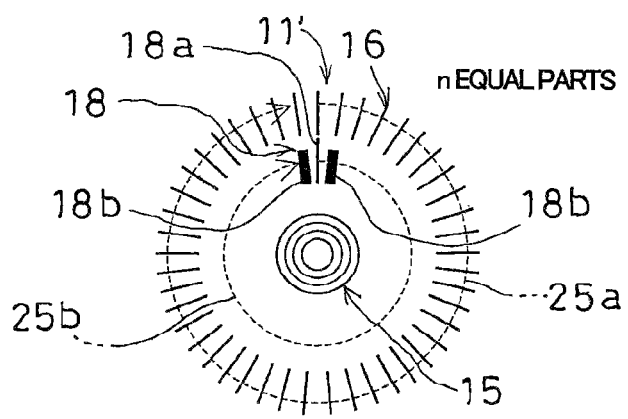
FIGS. 7A and 7B are drawings to show showing a second example of the angle detecting method using the angle detection pattern.
Figure 7B:
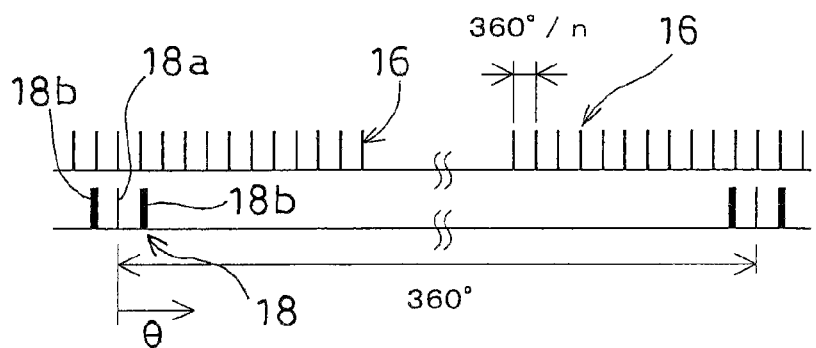

Next, in FIG. 7, description will be given on a second example of the angle detecting method. Further, the second example will be explained by using the second angle detection pattern 11 shown in FIG. 3. It is to be noted that FIG. 7B shows the linearly developed angle detection pattern 11.

A position of the pixel constituting the image sensor 12 is identified using a polar coordinate system, and a scan line 25 of the angle detection is determined as a circle. As to the scan line 25, an angle detection line 25a set to be equal to a reference circle of the line-segment pattern 16 (a circle that runs through an intermediate point between an inner end and an outer end of the line-segment pattern 16) and a reference position detection line 25b set on a circle running through the reference designation pattern 18 are set.

A reference position of the reference designation pattern 18 on the image sensor 12 is compared with a position of the reference designation pattern 18 obtained by scanning the reference position detection line 25b, and by this composition, a rotation angle of the angle detection pattern 11 is determined.

Further, in regard to the detection of an angle that is not greater than a pitch of the line-segment pattern 16, the signals of the line-segment pattern 16 corresponding to 360° are determined, the obtained detection signal of each line segment is multiplied by $\sin(2\pi n/360\theta)$ and $\cos(2\pi n/360\theta)$, and a phase in the pitch is determined based on a proportional relation of a sin component and a cos component.

Figure 8:
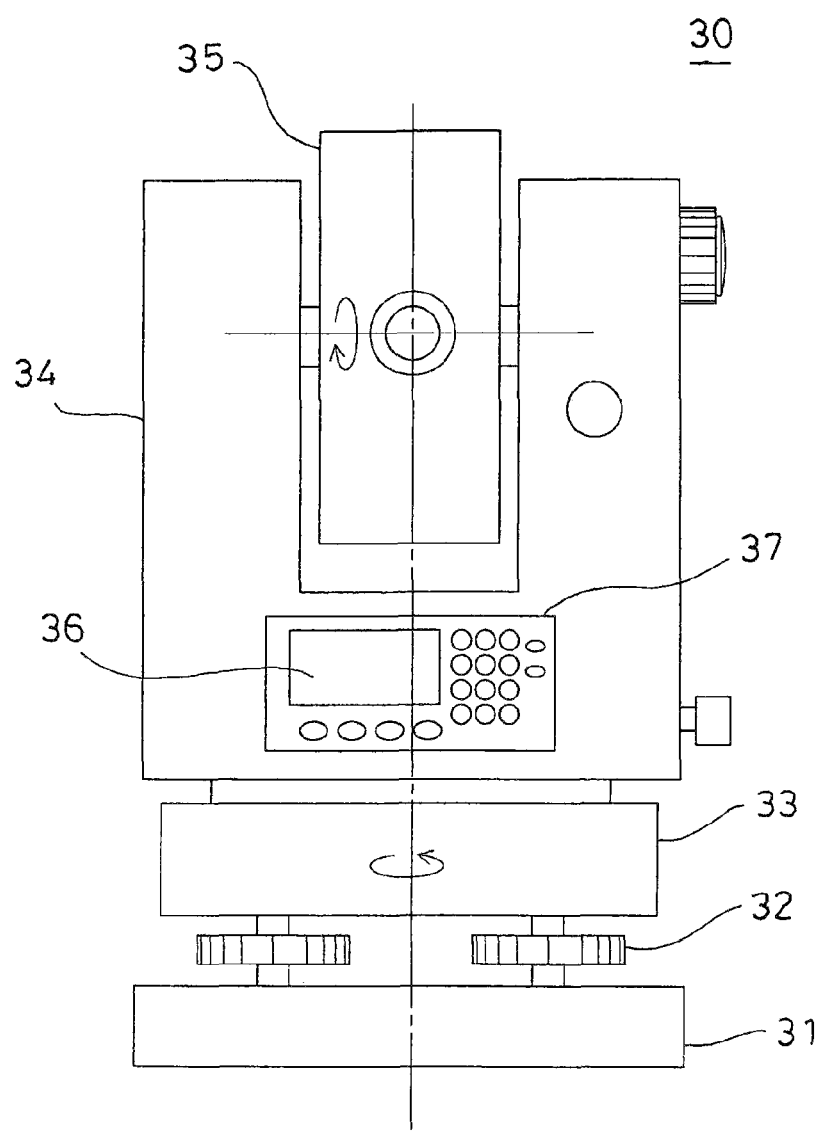
FIG. 8 is a front view to show an embodiment of a surveying instrument in which the rotation angle detecting apparatus according to the present invention is embodied.
Figure 9:
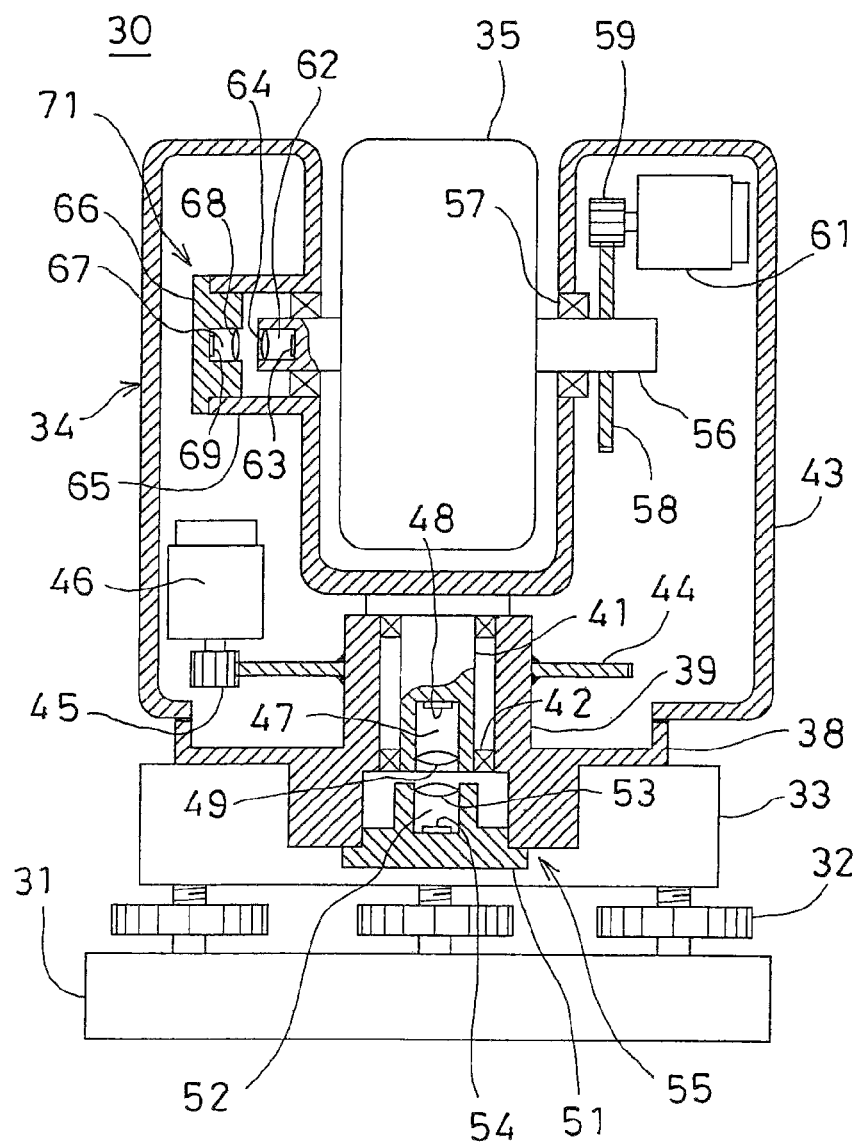
FIG. 9 is a schematic cross-sectional view of the surveying instrument.

Each of FIG. 8 and FIG. 9 shows a case where the rotation angle detection apparatus 6 is embodied in a total station 30 as a surveying instrument.

A base unit 33 is provided on a leveling unit 31 through leveling screws 32. A frame 34 is mounted on the base unit 33, and a telescope unit 35 including an optical system is supported on the frame 34. A distance measuring unit (not shown) is provided inside the telescope unit 35. The distance measuring unit is configured in such a manner that a distance measuring light is projected to an object to be measured from the telescope unit 35, the distance measuring light reflected on the object to be measured is received, and the distance measurement based on the received reflection light is carried out.

The base unit 33 can be leveled to be horizontal by the leveling screws 32. Moreover, the frame 34 is rotatable with a vertical shaft center line as a center, and the telescope unit 35 can rotate with a horizontal shaft center line as a center. Additionally, an operation input portion 37 having a display unit 36 is provided on the frame 34, and an operating state of the total station 30, a measurement value of a distance to the object to be measured, or the like is displayed in the display unit 36.

A frame base 38 is provided on an upper surface of the base unit 33, and a bearing holder 39 protruding upward is provided at the center of the frame base 38. A horizontal rotation shaft 41 is rotatably attached and engaged with the bearing holder 39 via a bearing 42, and a housing 43 of the frame 34 is fixedly attached to the horizontal rotation shaft 41. The frame base 38 constitutes a part of the base unit 33 that supports the housing 43 and has a function as a lower cover that closes a lower opening of the housing 43.

A horizontal rotary gear 44 is fixedly attached to the bearing holder 39, and a horizontal rotary drive gear 45 is engaged with the horizontal rotary gear 44. The horizontal rotary drive gear 45 is fixedly attached to an output shaft of a horizontal rotary motor 46. When the horizontal rotary drive gear 45 is rotated by the horizontal rotary motor 46, the housing 43 rotates with the horizontal rotation shaft 41 as a center in a horizontal direction via the horizontal rotary gear 44. It is designed so that the horizontal rotary motor 46 is fixedly attached to the housing 43, and the horizontal rotary motor 46 and the housing 43 are designed so as to integrally rotate.

A lower end portion of the horizontal rotation shaft 41 is hollow, and a hollow portion forms a first shaft portion space 47. A horizontal angle detection pattern 48 and a horizontal first condenser lens 49 are accommodated in the first shaft portion space 47, and the horizontal angle detection pattern 48 and the horizontal first condenser lens 49 are provided on a shaft center line of the horizontal rotation shaft 41.

A shaft portion holder 51 is provided on a lower surface of a central portion of the frame base 38, and a shaft centerline of the shaft portion holder 51 coincids with the shaft center line of the horizontal rotation shaft 41. A bearing holder space 52 that is a cylindrical concave portion is formed in the shaft portion holder 51 from an upper surface side, a horizontal second condenser lens 53 and a horizontal image sensor 54 are accommodated in the bearing holder space 52, and the horizontal second condenser lens 53 and the horizontal image sensor 54 are provided on the shaft center line of the shaft portion holder 51.

The horizontal angle detection pattern 48, the horizontal first condenser lens 49, the horizontal second condenser lens 53, and the horizontal image sensor 54 constitute primary portions of a horizontal rotation angle detecting apparatus 55 for detecting a horizontal angle.

A vertical rotation shaft 56 extending in the horizontal direction from both left and right ends is provided to the telescope unit 35, the vertical rotation shaft 56 is supported in the housing 43 via a bearing 57, and the telescope unit 35 can rotate with the vertical rotation shaft 56 as a center in the vertical direction.

A vertical rotary gear 58 is fixedly attached to one end of the vertical rotation shaft 56, and a vertical rotary drive gear 59 is engaged with the vertical rotary gear 58. The vertical rotary drive gear 59 is fixedly attached to an output shaft of a vertical rotary motor 61. When the vertical rotary motor 61 is driven, the telescope unit 35 is rotated with the vertical rotation shaft 56 as a center via the vertical rotary drive gear 59 and the vertical rotary gear 58.

A second shaft portion space 62 that is concentric with the vertical rotation shaft 56 is formed at the other end portion of the vertical rotation shaft 56, a vertical angle detection pattern 63 and a vertical first condenser lens 64 are accommodated in the second shaft portion space 62, and the vertical angle detection pattern 63 and the vertical first condenser lens 64 are provided on a shaft center line of the vertical rotation shaft 56.

A cylindrical holder support 65 is protruded inward so as to be concentric with the other end portion of the vertical rotation shaft 56, and a shaft portion holder 66 is fitted at an end portion of the holder support 65. A bearing holder space 67 that is concentric with the shaft center line of the vertical rotation shaft 56 is formed in the shaft portion holder 66, and a vertical second condenser lens 68 and a vertical image sensor 69 are accommodated in the bearing holder space 67. The vertical second condenser lens 68 and the vertical image sensor 69 are provided on the shaft center line of the vertical rotation shaft 56.

The vertical angle detection pattern 63, the vertical first condenser lens 64, the vertical second condenser lens 68, and the vertical image sensor 69 constitute primary portions of a vertical rotation angle detecting apparatus 71 for detecting a vertical angle (an elevation angle).

The total station 30 is leveled by the leveling screws 32. After the leveling, the total station 30 is set as a reference position.

Then, to make the telescope unit 35 perform sighting with respect to a object to be measured, the horizontal rotary motor 46 is driven to rotate the housing 43 in the horizontal direction. A horizontal rotary angle of the housing 43 is detected by the horizontal rotary angle detecting apparatus 55. Further, the shaft shifting (a tilt of the shaft) of the horizontal rotation shaft 41 is simultaneously detected, and the horizontal angle detected by the horizontal rotation angle detecting apparatus 55 is corrected based on the detected shaft shifting.

Further, the vertical rotary motor 61 is driven, and the telescope unit 35 is rotated in the vertical direction. A vertical rotation angle of the telescope unit 35 is detected by the vertical rotation angle detecting apparatus 71, and the shaft shifting of the vertical rotation shaft 56 is detected at the same time. Likewise, the vertical angle detected by the vertical rotation angle detecting apparatus 71 is corrected based on the detected shaft shifting.

When the sighting of the telescope unit 35 is completed, a distance measuring light is emitted from the telescope unit 35, a distance to the object to be measured is measured, and a horizontal angle and an elevation angle are measured by the horizontal rotation angle detecting apparatus 55 and the vertical rotation angle detecting apparatus 71 at the same time.

In the surveying instrument according to the present embodiment, a horizontal angle and an elevation angle can be highly accurately measured without using an expensive encoder, the horizontal rotation angle detecting apparatus 55 and the vertical rotation angle detecting apparatus 71 do not require a fabrication accuracy, the manufacture is inexpensively enabled, and a fabrication cost of the surveying instrument can be reduced.

The invention claimed is:

1. A rotation angle detecting apparatus, comprising a bearing holder, a rotation shaft rotatably supported by said bearing holder, a shaft portion space formed in said rotation shaft, a bearing holder space formed in said bearing holder, a first condenser lens which is accommodated in said shaft portion space and has an optical axis that coincides with a center line of said rotation shaft, a second condenser lens which is provided in said bearing holder space and also provided on an extension of a center line of said rotation shaft, an angle detection pattern provided at a focal position of one of said first condenser lens and said second condenser lens, and an image sensor provided at a focal position of the other of said first condenser lens and second condenser lens, wherein said image sensor detects a projection image of said angle detection pattern projected onto said image sensor, a displacement of said projection image involved by the rotation of said rotation shaft is detected, and a rotation angle of said rotation shaft and a tilt angle of said rotation angle are detected based on the displacement detected.

2. The rotation angle detecting apparatus according to claim 1, wherein a reference position can be set on said image sensor, and a rotational displacement amount of said angle detection pattern with respect to said reference position is detected.

3. The rotation angle detecting apparatus according to claim 1, wherein said angle detection pattern is detected by said image sensor, a center position of an angle detection pattern image is detected based on said angle detection pattern, and a tilt angle of said rotation shaft is detected based on a deviation between the detected center position of said angle detection pattern image and said reference image on said image sensor and based on a focal length of said first condenser lens or said second condenser lens.

4. The rotation angle detecting apparatus according to any one of claims 1 to 3, wherein said angle detection pattern has a line-segment pattern in which line segments extending in a radial direction are arranged on a total circumference at a predetermined angle pitch and a ring-like track formed of said line segments is provided.

5. The rotation angle detecting apparatus according to any one of claims 1 to 3, wherein said angle detection pattern has a circular pattern of one circle or a plurality of concentric circles with the center of said angle detection pattern as a center.

6. The rotation angle detecting apparatus according to any one of claims 1 to 3, wherein said angle detection pattern has a plurality of concentrically multiply-formed ring-like tracks.

7. The rotation angle detecting apparatus according to any one of claims 1 to 3, wherein said angle detection pattern is detected when a detection line is set on said image sensor and a detection signal of said angle detection pattern is extracted from a signal obtained by scanning said detection line.

8. The rotation angle detecting apparatus according to claim 7, wherein said detection line is a straight line which runs through the center of said angle detection pattern on said image sensor and is set to fall within the range including each track in accordance with each track in a direction orthogonal to each radius that equally divides the circumference as required.

9. The rotation angle detecting apparatus according to claim 5, wherein said angle detection pattern is detected when a detection line is set on said image sensor and a detection signal of said angle detection pattern is extracted from a signal obtained by scanning said detection line, and said detection line is a straight line which runs through the center of said angle detection pattern on said image sensor and cuts across said circular pattern.

10. The rotation angle detection apparatus according to claim 7, wherein said detection line is a circle which is included in said track and has the center of said angle detection pattern on said image sensor as its center.

11. A surveying instrument, comprising a base unit, a frame rotatably provided on said base unit through a first rotation shaft having a vertical shaft center line, a telescope unit rotatably provided on said frame through a second rotation shaft having a horizontal shaft center line, a first rotation angle detecting apparatus which is provided between said first rotation shaft and said base unit and has the configuration according to claim 1, and a second rotation angle detecting apparatus which is provided between said second rotation shaft and said mount and has the configuration according to claim 1.

* * * * *